Sept. 28, 1965

J. F. REUTHER 3,209,233

DOUBLE AUCTIONEERING CONTROL CIRCUIT

Filed Aug. 23, 1962

WITNESSES
Donald R. Lackey
John L. Clopp

INVENTOR
John F. Reuther
BY
F. E. Browder
ATTORNEY

United States Patent Office 3,209,233
Patented Sept. 28, 1965

3,209,233
DOUBLE AUCTIONEERING CONTROL CIRCUIT
John F. Reuther, Penn Hills Township, Allegheny County, Pa., assignor to Westinghouse Electric Corporation, East Pittsburgh, Pa., a corporation of Pennsylvania
Filed Aug. 23, 1962, Ser. No. 218,961
22 Claims. (Cl. 322—24)

This invention relates to electrical control apparatus and more particularly to auctioneering circuits used in electrical control apparatus, such as regulator systems.

United States Patent 3,001,123, issued on an application by J. F. Reuther et al. and assigned to the same assignee as the present application, disclosed a single auctioneering or control circuit in which the output is responsive to or varies with only the larger or the smaller of two input control currents. In certain types of electrical control apparatus, such as the type which includes magnetic amplifiers, it is sometimes necessary to provide a double auctioneering or control circuit that is responsive to or varies with an input signal within upper and lower limits, as established by two additional input signals. This invention relates to electrical apparatus for performing this double auctioneering function.

In conventional control or auctioneering circuits comparison of the input signals is usually accomplished on the basis of the relative voltages of the control signals. In certain applications, the comparison of control voltages has disadvantages. For example, the difference between the voltages of the control signals may be so great that it is necessary to introduce additional amplification for one of the control signals before comparing their voltages. In addition, the introduction of additional amplification in certain types of electrical control apparatus, such as regulator systems, adversely affects the stability of the overall control apparatus.

It is, therefore, desirable to provide an improved control or double auctioneering circuit in which the output varies with an input signal, as modified by upper and lower limits set by two additional input signals, and in which the comparison of the control signals is accomplished on a current basis rather than on a voltage basis.

It is an object of this invention to provide a new and improved electrical control apparatus for obtaining an output which varies with the control signal between upper and lower limits established by two additional control signals.

A further object of this invention is to provide an improved auctioneering circuit for obtaining an output which varies with an input control current between upper and lower limits established by two additional control currents.

A further object of this invention is to provide a new and improved limit circuit for use in electrical control apparatus, such as regulator systems.

Briefly, the present invention accomplishes the above cited objects by comparing upper and lower limit control currents and a third control current. More specifically, the third control current is compared with the upper control current and it is also compared with the lower control current. If the third control current is between the upper and lower limit control currents, the output of the invention will be responsive to or vary with the third control current. If the third control current is above the upper limit control current, the output of the invention will be determined by the upper limit control current. Similarly, if the third control current is below the lower limit control circuit, the output of the invention will be determined by the lower limit control current.

Further objects and advantages of the invention will become apparent as the following description proceeds and features of novelty which characterize the invention will be pointed out in particularity in the claims annexed to and forming a part of this specification.

For a fuller understanding of the invention, reference may be had to the accompanying drawings, in which.

Figure 1:
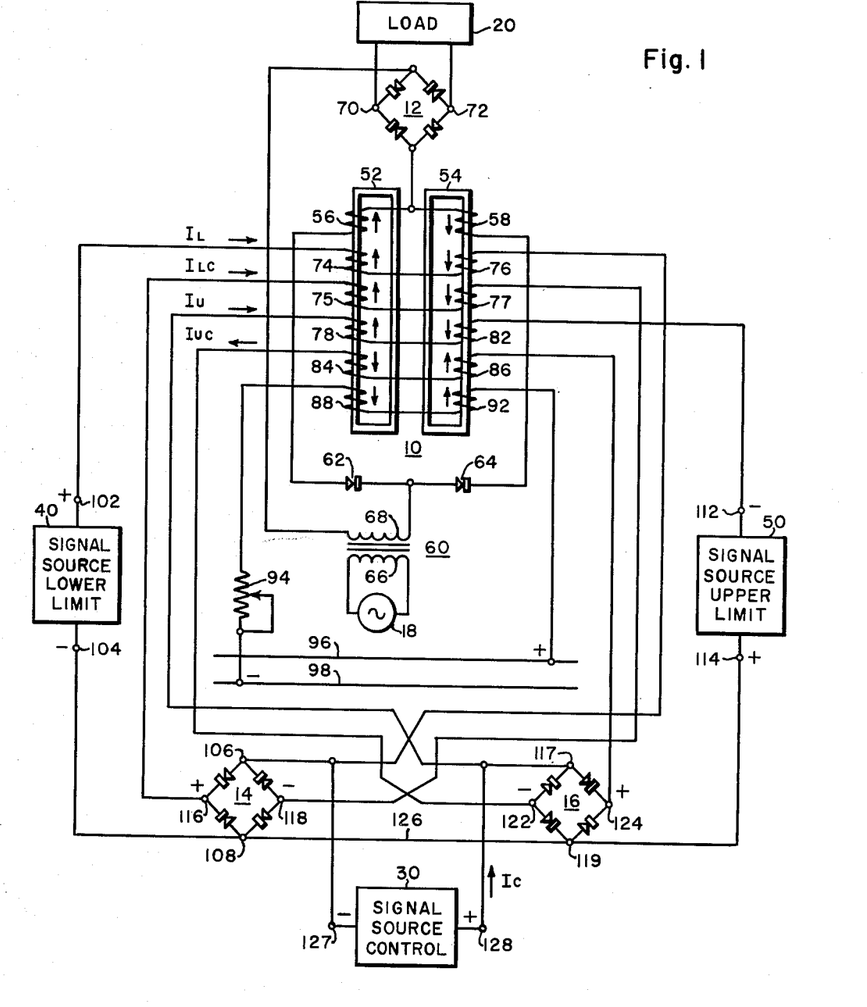
FIGURE 1 is a schematic diagram of one of the embodiments of the invention.

In general, the control or double auctioneering circuit shown in FIGURE 1 comprises a magnetic amplifier 10 and rectifier means including the rectifiers 12, 14 and 16 which are connected in circuit relationship between a source of alternating current voltage 18 and a load circuit including a load 20. An output signal or voltage which varies with the current $I_c$ from the control signal source 30, between upper and lower limits as established by currents $I_L$ and $I_u$ from lower limit signal source 40 and upper limit signal source 50, respectively, is applied to load 20. The magnetic amplifier 10 comprises two magnetic core members 52 and 54, with the load windings 56 and 58 disposed in inductive relationship with the magnetic core members 52 and 54, respectively. Self-saturation for the magnetic amplifier 10 is obtained by connecting in series circuit relationship with the load windings 56 and 58 the self-saturating rectifiers 62 and 64, respectively. The series circuit including the load winding 56 and the self saturating rectifier 62 is connected in parallel circuit relationship with the series circuit including the load winding 58 and self-saturating rectifier 64, which forms a doubler circuit of the magnetic amplifier 10.

Energy for the load windings 56 and 58 of the magnetic amplifier 10 is received from a transformer 60 having a primary winding 66 responsive to the output voltage of the alternating current source 18, and a secondary winding 68.

A full wave dry type load rectifier 12 is interconnected with the previously described parallel circuit of the magnetic amplifier 10 and with the secondary winding 68 of the transformer 60 in order to produce a direct current output from the magnetic amplifier 10 at the output terminals 70 and 72 which are connected to the load circuit which includes load 20.

For the purpose of biasing the magnetic amplifier 10 by a predetermined amount, the bias windings 88 and 92 are disposed in inductive relationship with the magnetic core members 52 and 54, respectively. In particular, the bias windings 88 and 92 are connected in a series circuit relationship with one another, the series circuit being connected through an adjusting rheostat 94 to the conductors 96 and 98 which have applied thereto a substantially constant direct current voltage. In operation, the current flow through the bias windings 88 and 92 produces a magnetomotive force or ampere-turns with respect to their respective magnetic core members that opposes the magnetomotive force or ampere-turns produced by the current flow through the load windings 56 and 58, respectively.

In order to render the magnetic amplifier 10 responsive to the unidirectional or direct current input control signal or current $I_L$ from lower limit signal source 40 at terminals 102 and 104, a first set of control windings 74 and 76 is disposed in inductive relationship with the magnetic core members 52 and 54 respectively. In particular, the lower limit control windings 74 and 76 are connected in series circuit relationship with one another, the series circuit being connected between terminal 102 of the lower limit signal source 40, and the upper terminal 106 of the rectifier means 14.

In order to render the magnetic amplifier 10 responsive to the second unidirectional or direct current input control signal or current $I_u$ from the upper limit signal source 50 at terminals 112 and 114, a second set of control windings 78 and 82 is disposed in inductive relationship with the magnetic core members 52 and 54, respectively. In particular, the upper limit control windings 78 and 82 are connected in series circuit relationship with one another, the series circuit being connected between terminal 112 of the upper limit signal source 50 and the upper input terminal 117 of the rectifier means 16. The lower terminal 104 of the lower limit signal source 40 is connected to the lower terminal 108 of rectifier means 14 and the lower input terminal 114 of upper limit signal source 50 is connected to lower terminal 119 of rectifier means 16. The lower terminals 108 and 119 of rectifier means 14 and 16, respectively, are connected together by line 126.

The lower limit control windings 74 and 76 of the magnetic amplifier 10 are so disposed on their respective magnetic core members 52 and 54 that when the lower limit control signal or current $I_L$ from the lower limit signal source 40 flows therethrough in the direction indicated in FIGURE 1, a magnetomotive force is produced in the respective core members that is additive with respect to the magnetomotive force or ampere turns produced by the curent flow through the respective load windings 56 and 58. Similarly, the upper limit control windings 78 and 82 of the magnetic amplifier 10 are so disposed on their respective magnetic cores 52 and 54 that when the upper limit control signal or current $I_u$ from the upper limit signal source 50 flows therethrough in the direction indicated in FIG. 1, a magnetomotive force is produced in the respective core members that is also additive with respect to the magnetomotive force or ampere-turns produced by the current flow through the respective load windings 56 and 58.

If it is assumed as a reference direction, that the direction of an input control signal or current is positive when the ampere-turns or magnetomotive force produced by the flow of said input signal or current in the associated control windings is additive with respect to the magnetomotive force or ampere-turns produced by the flow of current through the respective load windings 56 and 58 thus tending to drive the magnetic core members 52 and 54 towards saturation and increasing the output signal of the magnetic amplifier 10, then the directions of the upper and lower limit control signals or currents $I_u$ and $I_L$, respectively, would both be positive with respect to the assumed reference direction. On the other hand, if the directions of the input control signals or currents applied to the lower limit control windings 74 and 76 and to the upper limit control windings 78 and 82 were opposite to the assumed reference direction, which would also be opposite in direction to the directions of the lower and upper input control signals or currents $I_L$ and $I_u$, resepctively, shown in FIG. 1, then the direction of such input control signals or currents would be negative with respect to the assumed reference direction thus tending to drive the magnetic core members 52 and 54 away from saturation and decreasing the output signal of the magnetic amplifier 10.

In order to render the magnetic amplifier 10 responsive to a control signal source and determine whether the control signal source is between, above or below a predetermined range, as established by lower and upper limit signal sources 40 and 50, respectively, a third set of control windings 75 and 77, and a fourth set of control windings 84 and 86, are disposed in inductive relationship with magnetic core members 52 and 54 respectively. In particular, the third control windings 75 and 77 are connected in a series circuit relationship with each other, the series circuit being connected across the output terminals 116 and 118 of rectifier means, or full wave bridge type rectifier 14, whose input terminals 106 and 108 are connected across the series circuit comprising the lower limit signal source 40 and lower limit control windings 74 and 76. Also, terminal 127 of control signal source 30 is connected to input terminal 106 of rectifier means 14 and the other input terminal 108 of rectifier means 14 is connected to input terminal 119 of rectifier means 16. In operation, the full wave rectifier 14 applies a difference signal or current $I_{Lc}$ to the third control windings 75 and 77 which varies with the absolute magnitude of the algebraic difference between the lower limit current $I_L$ and the control current $I_c$, the direction of the difference signal or current $I_{Lc}$ being always in a positive direction with respect to the assumed reference direction previously discussed because of the manner in which the full wave rectifier 14 is connected in circuit relation with the control windings 75 and 77 of the magnetic amplifier 10. More specifically, because of the rectifier action of rectifier bridge 14, the current through windings 75 and 77 of magnetic amplifier 10 is always in the direction illustrated. This is true regardless of which of the two signal source currents, $I_L$ and $I_c$, is larger. If $I_c$ is larger than $I_L$, the current $I_{Lc}$ flows from terminal 106 to terminal 116 of rectifier 14, through windings 75 and 77 of magnetic amplifier 10, back to terminal 118 and then to terminal 108 of rectifier 14. If $I_L$ is larger than $I_c$, the current $I_{Lc}$ flows from terminal 108 to terminal 116 of rectifier 14 through windings 75 and 77 of magnetic amplifier 10 and back to terminal 118 and then to terminal 106 of rectifier 14. In both cases, the current $I_{Lc}$ flows in the same direction through windings 75 and 77 of magnetic amplifier 10. The third control windings 75 and 77 are so disposed on their respective magnetic core members 52 and 54 that when the difference signal or current $I_{Lc}$ flows therethrough in the direction indicated in FIG. 1, as determined by the full wave rectifier 14, a magnetomotive force is produced in the respective magnetic core members that is additive with respect to the magnetomotive force or ampere-turns produced by the current flow through the respective load windings 56 and 58.

The fourth control windings 84 and 86 are connected in a series circuit relationship with each other, the series circuit being connected across the output terminals 122 and 124 of full wave bridge type rectifier 16 whose input terminals 117 and 119 are connected across the series circuit comprising the upper limit signal source 50 and the upper limit control windings 78 and 82. Also, terminal 128 of control signals source 30 is connected to input terminal 117 of rectifier means 16 and the other input terminal 119 of rectifier means 16 is connected to input terminal 108 of rectifier means 14. In operation, the full wave rectifier 16 applies a difference signal or current $I_{uc}$ to the fourth control windings 84 and 86 which varies with the absolute magnitude of the algebraic difference between the upper limit current $I_u$ and the control current $I_c$, the direction of the difference signal or current $I_{uc}$ being always in a negative direction with respect to the assumed reference direction previously discussed because of the manner in which the full wave rectifier 16 is connected in circuit relation with the control windings 84 and 86 of the magnetic amplifier 10. This is due to rectifier action of bridge rectifier 16, the mechanics of which were previously described relative to bridge rectifier 14. The fourth control windings 84 and 86 are so disposed on their respective magnetic core members 52 and 54 that when the difference signal or current $I_{uc}$ flows therethrough in the direction indicated in FIGURE 1, as determined by full wave rectifier 16, a magnetomotive force is produced in the respective magnetic core members that subtract from the magnetomotive force or ampere-turns produced by the current flow through the respective load windings 56 and 58. For reasons which will be discussed hereinafter, the number of turns in each set of control windings is substantially equal to the number of turns in each of the other sets of control windings.

In the operation of the control or auctioneering circuit shown in FIG. 1, the output signal or voltage of the magnetic amplifier 10 which appears at the output terminals 70 and 72 is responsive to or varies with the algebraic sum or net total of the ampere-turns or magnetomotive forces produced by the flow of the lower limit signal current $I_L$ and upper limit signal current $I_u$ through lower limit control windings 74 and 76 and upper limit control windings 78 and 82, respectively, and by the flow of the difference signals or currents $I_{Lc}$ and $I_{uc}$ in windings 75 and 77 and windings 84 and 86, respectively. The sum or net total of the ampere-turns produced by the flow of control signals or currents in the four sets of control windings of the magnetic amplifier 10 in turn varies with or is responsive only to the control signal current $I_c$ when control signal $I_c$ is in the proper range. When control signal $I_c$ is not in the proper range, as determined by the magnitudes of the lower limit control current $I_c$ and upper limit control current $I_u$, then only one or the other limit currents will control. For instance, if the control signal current $I_c$ exceeds the upper limit current $I_u$, then the magnetic amplifier 10 will be responsive only to the upper limit control current $I_u$. If the control signal current is below the lower limit current $I_L$, then the magnetic amplifier 10 will be responsive only to the lower limit current $I_L$.

For example, assume that during operation the directions of the currents $I_L$, $I_u$, $I_{Lc}$ and $I_{uc}$ are as shown in FIG. 1, with $I_L$, $I_u$, $I_{Lc}$ being positive with respect to the assumed reference direction and $I_{uc}$ being negative with respect to the assumed reference direction. The small arrows within the core members 52 and 54 illustrate the direction of the magnetomotive force produced by the respective currents through the windings of the magnetic amplifier 10. Also, assume that the magnitude of the upper control current $I_u$ is greater than the magnitude of the lower limit control current $I_L$ and that the control signal current $I_c$ is in the proper operating range. In other words, the control signal current is larger than the lower limit current $I_L$ and less than the upper limit current $I_u$. As previously mentioned, the turns in each of the first, second, third and fourth control windings of the magnetic amplifier 10 are substantially equal. Assuming that the number of turns in each set of control windings is equal to $N/2$, the algebraic sum or net total of the ampere-turns produced by the flow of the respective control currents in the first, second, third and fourth control windings of the magnetic amplifier 10 may be expressed by the following general equation:

(1) $\quad \frac{N}{2}I_L + \left|\frac{N}{2}(I_L - I_c)\right| - \left|\frac{N}{2}(I_c - I_u)\right| + \frac{N}{2}I_u = NI_c$ or $NI_L$ or $NI_u$ (depending upon the magnitude of $I_c$)

The perpendicular lines bracketing the above quantities $$\frac{N}{2}(I_L - I_c)$$

and $$\frac{N}{2}(I_c - I_u)$$

of Equation 1 denotes the rectifier action previously described. Since the directions of current flow is always the same from rectifiers 14 and 16, only the signs outside the brackets are used in obtaining the algebraic sum of all the ampere turns. The signs inside the brackets are disregarded once the magnitude of the difference is obtained between the limit currents and the control current. Assuming that the upper current limit $I_u$ is greater than the control current $I_c$ and the control current $I_c$ is greater than the lower limit current $I_L$, the absolute magnitude of $$\left|\frac{N}{2}(I_L - I_c)\right|$$

would be equal to $$\frac{N}{2}(I_c - I_L)$$

and the absolute magnitude of $$\left|\frac{N}{2}(I_c - I_u)\right|$$

would be equal to $$\frac{N}{2}(I_u - I_c)$$

Using these forms in general Equation 1 we have:

(2) $\quad \frac{N}{2}I_L + \frac{N}{2}(I_c - I_L) - \frac{N}{2}(I_u - I_c) + \frac{N}{2}I_u = NI_c$ As shown by the solution of Equation 1 in line 2, the sum or the net total of the ampere-turns produced by the flow of the respective control currents in the first, second, third and fourth sets of control windings of the magnetic amplifier 10 during the assumed operating condition is determined by the control current $I_c$. Therefore, when the control current $I_c$ is in the proper range, between the upper and lower predetermined limits, the output of the magnetic amplifier 10 varies with or is responsive to the control current $I_c$.

Now, assume that the control current $I_c$ from the control signal source 30 exceeds the upper limit current $I_u$ from upper limit signal source 50, and upper limit current $I_u$ exceeds lower limit current $I_L$. Also, again assume the number of turns in each control winding is equal to $N/2$. First, the absolute magnitude of $$\left|\frac{N}{2}(I_L - I_c)\right|$$

would be equal to $$\frac{N}{2}(I_c - I_L)$$

and the absolute magnitude of $$\left|\frac{N}{2}(I_c - I_u)\right|$$

would be equal to $$\frac{N}{2}(I_c - I_u)$$

Using these forms in general Equation 1 we find that the net total of ampere-turns produced by the flow of the respective control currents in the first, second, third and fourth control windings of magnetic amplifier 10 during the assumed operating condition may be expressed as follows:

(3) $\quad \frac{N}{2}I_L + \frac{N}{2}(I_c - I_L) - \frac{N}{2}(I_c - I_u) + \frac{N}{2}I_u = NI_u$ As shown by the solution of Equation 1 in line 3, the net total of ampere-turns produced during the assumed operating condition is determined by the upper limit current $I_u$. Therefore, when the control current $I_c$ is above the upper limit current $I_u$, the output of the magnetic amplifier 10 is responsive to the upper limit current $I_u$ only.

The last possibility is where the control current is less than the lower limit current $I_L$ produced by the lower limit signal source 40. Therefore, the upper limit control current $I_u$ exceeds the lower limit current $I_L$ and the current $I_L$ exceeds the control current $I_c$. The absolute magnitude of $$\left|\frac{N}{2}(I_L - I_c)\right|$$

would then be equal to $$\frac{N}{2}(I_L - I_c)$$

and the absolute magnitude of $$\left|\frac{N}{2}(I_c - I_u)\right|$$

would be equal to $$\frac{N}{2}(I_u - I_c)$$

Using these forms in general Equation 1, we find that the net total ampere-turns produced by the flow of the respective control currents in the first, second, third and fourth control windings of magnetic amplifier 10 during the assumed operating condition may be expressed as follows:

(4) $\quad \frac{N}{2}I_L + \frac{N}{2}(I_L - I_c) - \frac{N}{2}(I_u - I_c) + \frac{N}{2}I_u = NI_L$ As shown by the solution of Equation 1 in line 4, the net total of ampere turns produced during the assumed operating condition is determined by the lower limit control current $I_L$. Therefore, when the control current $I_c$ is below the lower limit current $I_L$, the output of the magnetic amplifier 10 is responsive to the lower limit current $I_L$ only.

In summary, the output signal or voltage of the magnetic amplifier 10 varies with or is responsive to the control signal or current $I_c$, when the magnitude of the control current $I_c$ is between the magnitudes of the upper and lower limit currents $I_u$ and $I_L$, respectively. If the control current $I_c$ exceeds the upper limit control current $I_u$, then $I_u$ will take over and determine the output of the magnetic amplifier 10. If the control current $I_c$ is less than the lower limit current $I_L$, then $I_L$ will take over and determine the output of the magnetic amplifier 10.

Figure 2:
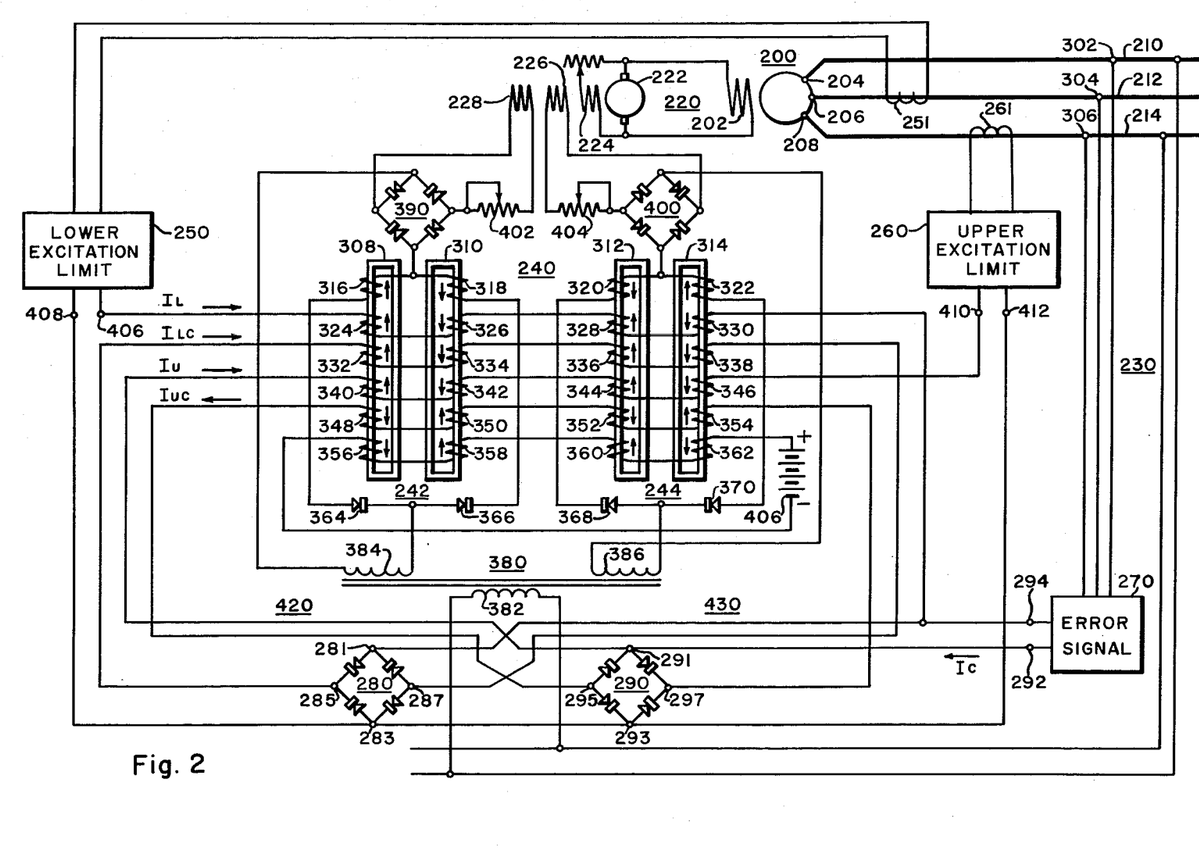
FIG. 2 is a schematic diagram of a second embodiment of the invention.

Referring now to FIG. 2 there is illustrated a dynamoelectric machine, more specifically a synchronous generator 200, having an excitation field winding and output terminals. The generator 200 is disposed to supply energy or electric power to the line conductors 210, 212, and 214 which are part of a three phase electrical system or circuit. In order to obtain an excitation voltage across the field winding 202 of sufficient magnitude, an exciter 220 is provided. In this instance, the exciter 220 comprises an armature 222 which supplies current to the field winding 202 of the generator 200, a self-exciting field winding 224 and a buck and boost excitation field winding 226 and 228, respectively. In order to maintain the output voltage of the generator 200 at substantially a predetermined value, a regulator loop or system 230, comprising an error detecting circuit 270 for obtaining an error signal or current which varies with the deviation of the output voltage of the generator 200 from its regulated value and a push-pull magnetic amplifier 240, is interconnected between the output of the generator 200 and the buck and boost field windings 226 and 228 of the exciter 220.

A minimum or under excitation limit circuit 250 may be connected to the output of the generator 200, such as through current transformer 251, for obtaining a limiting signal which varies with the stability limits of the generator 200 and cooperates with the push pull magnetic amplifier 240 of the regulator loop 230 to prevent the generator 200 from falling out of step or synchronism during certain operating conditions. A minimum excitation circuit that would be suitable for this application is disclosed in U.S. Patent 2,862,172 which was issued on an application of J. T. Carleton et al. and assigned to the same assignor as the present application. Of course, a constant current source, independent of the voltage output may also be used.

A maximum or overexcitation limit circuit 260, either responsive to the generator 200, such as through current transformer 261, or a constant current source, is used to obtain a constant current which will produce a limiting signal or current selected to prevent overexcitation and the resultant overheating and possible damage to the generator 200 which would result.

In addition, a double auctioneering circuit 420 and 430 comprising the fullwave rectifiers 280 and 290 and the control windings of the push-pull magnetic amplifier 240 is connected in circuit relation with the error detecting circuit 270 and the under and overexcitation limits 250 and 260, respectively, in order that the net output of the magnetic amplifier 240, and in turn the regulator system 230, responds to or varies with only the error signal from the error detecting circuit 270 within the upper and lower limits established by overexcitation limit circuit 260 and under excitation limit circuit 250.

In general, the error detecting circuit 270 is connected in circuit relation with the output terminals 204, 206 and 208 of the generator 200 for obtaining an output signal or current which varies with the deviation of the output voltage of the generator 200 from a predetermined regulated value. More specifically, error detecting circuit 270 is connected to generator output terminals 204, 206 and 208 by connections 302, 304 and 306 to lines 210, 212 and 214, respectively. Any one of the several common error detecting circuits may be used to produce the unidirectional error signal at output terminals 292 and 294 of error detecting circuit 270. For example, the error detecting circuit shown and described in U.S. Patent 3,001,123, previously referred to, would be suitable. The output signal or current of the error detecting circuit 270 which appears at the output terminals 292 and 294 is a measure of the deviation of the output voltage of the generator 200 from the predetermined desired regulated value.

The push-pull magnetic amplifier 240 comprises two main sections 242 and 244. Each of the sections 242 and 244 of the magnetic amplifier 240 is similar to the magnetic amplifier 10 of the double auctioneering circuit shown in FIG. 1. The section 242 comprises two magnetic core members 308 and 310 and the section 244 comprises two magnetic core members 312 and 314. In this instance, the load windings 316, 318, 320 and 322 are disposed in inductive relationship with the magnetic core members 308, 310, 312 and 314, respectively. Self-saturation for the magnetic amplifier 240 may be obtained by connecting in series circuit relationship with the load windings 316, 318, 320 and 322, the self-saturating rectifiers 364, 366, 368 and 370, respectively.

In order to form a doubler circuit of the section 242, the series circuit including the load winding 316 and the self-saturating rectifier 364 is connected in parallel circuit relationship with the series circuit including the load winding 318 and the self-saturating rectifier 366. In like manner, in order to form a doubler circuit of the section 244, the series circuit including the load winding 320 and the self-staturating rectifier 368 is connected in parallel circuit relationship with the series circuit including the load winding 322 and the self-saturating rectifier 370.

Energy from the load windings 316, 318, 320 and 322 of the magnetic amplifier 240 is received from a transformer 380 having a primary winding 328 which is responsive to the output voltage of the generator 200 and the line conductors 210 and 214. As illustrated, a full wave dry type load rectifier 390 is interconnected with the hereinbefore described parallel circuit of the section 242 and with the secondary winding 384 of the transformer 380 in order to produce a unidirectional or direct current output of the section 242. In like manner, a full wave, dry type load rectifier 400 is interconnected with the hereinbefore described parallel circuit of the section 244 and with the secondary winding 386 of the transformer 380 in order to obtain a unidirectional current or direct current output for section 244.

In this instance, the boost field winding 228 of the exciter 220 is responsive to the output of the load rectifier 390 of section 242 and the buck field winding 226 of exciter 220 is responsive to the output of the load rectifier 400 of section 244. In operation, the buck field winding 226 opposes the boost field winding 228. In order to provide means for changing the gain in the regulator loop 230, the variable resistors 402 and 404 are connected in series with the boost field winding 228 and with the buck field winding 226, respectively.

For the purpose of biasing sections 242 and 244 of the magnetic amplifier 240 a predetermined amount, the bias windings 356, 358, 360 and 362 are disposed in inductive relationship with the magnetic core members 308, 310, 312 and 314, respectively. In particular, the bias windings 356, 358, 360 and 362 are connected in series circuit relationship with one another, the series circuit being connected to a substantially constant direct current source 406. In operation, the current flow through the bias windings 356, 358, 360 and 362 produces ampere-turns or magetomotive force with respect to their respective magnetic core members that opposes the ampere-turns or magnetomotive force produced by the current flow through the load windings 316, 318, 320 and 322.

In order to render the magnetic amplifier 240 responsive to the lower excitation limit signal or current flow from excitation limit circuit 250, control windings 324, 326, 328 and 330 are disposed in inductive relationship with magnetic core members 308, 310, 312 and 314, respectively. The control windings 324, 326, 328 and 330 are connected in a series circuit relationship with one another, the series circuit being connected between the output terminal 406 of the lower excitation limit circuit 250 and the upper input terminal 281 of full wave rectifier 280. The lower input terminal 283 of rectifier 280 is connected to the other output terminal 408 of the lower excitation limit circuit 250. The control windings 324, 326, 328 and 330 are so disposed on their respective magnetic core members 308, 310, 312 and 314 that when current flows therethrough, the magetomotive force or ampere turns produced thereby in the respective magnetic core members is additive with respect to the magnetomotive force or ampere-turns produced by the current flow through the respective load windings 316, 318, 320 and 322.

In order to render the magnetic amplifier 240 responsive to the upper excitation limit signal or current $I_u$ from overexcitation limit circuit 260, control windings 340, 342, 344 and 346 are disposed in inductive relationship with magnetic core members 308, 310, 312 and 314, respectively. These control windings 340, 342, 344 and 346 are connected in series circuit relationship with one another, the series circuit being connected between output terminal 410 of the overexcitation limit circuit 260 and the upper input terminal 291 of the full wave rectifier 290. The lower input terminal 293 of the rectifier 290 is connected to the other output terminal 412 of the upper excitation circuit 260. The control windings 340, 342, 344 and 346 are so disposed on their respective magnetic core members 308, 310, 312 and 314 that when current flows therethrough the magnetomotive force or ampere-turns produced thereby in the respective magnetic core members is additive with respect to the magnetomotive force or ampere-turns produced by the current flow through the load windings 316, 318, 320 and 322.

In order to render the magnetic amplifier 240 responsive to the error signal from error detecting circuit 270 when said error signal is between certain upper and lower limits, a double auctioneering circuit 420 and 430 is provided. The double auctioneering circuit 420 and 430 comprises four sets of control windings 324, 326, 328 and 330; 332, 334, 336 and 338; 340, 342, 344 and 346; and 348, 350, 352 and 354 and the full wave rectifiers 280 and 290. The first portion of the double auctioneering circuit 420 compares the error signal or current from the error detecting circuit 270 with the signal or current from the lower excitation limit circuit 250. The upper input terminal 281 of full wave rectifier 280 is connected to the output terminal 294 of the error detecting circuit 270. The output of full wave rectifier 280 is connected to control windings 332, 334, 336 and 338, said windings being connected in a series circuit relationship and disposed inductively on magnetic core members 308, 310, 312 and 314, respectively. During operation, the current which flows in the control windings 332, 334, 336 and 338 of the magnetic amplifier 240 is the difference between the error signal $I_c$ or current from the error detecting circuit 270 and the limit signal or current $I_L$ from the lower excitation limit circuit 250. The control windings 332, 334, 336 and 338 of the magnetic amplifier 240 are so disposed on their respective magnetic core members 308, 310, 312 and 314 that when current flows therethrough, the magnetomotive force or ampere-turns produced thereby in the magnetic core members 308 and 310, respectively, is additive with respect to the magnetomotive force or ampere-turns produced by the current flow through the respective load windings 316 and 318 and the magnetomotive force or ampere-turns produced thereby in the magnetic core members 312 and 314 opposes the magnetomotive force or ampere-turns produced by the current flow through the respective load windings 320 and 322.

The second portion 430 of the double auctioneering circuit compares the error signal or current $I_c$ from error detecting circuit 270 with the signal or current from upper excitation limit circuit 260. The upper input terminal 291 of full wave rectifier 290 is connected to the output terminal 292 of error detecting circuit 270. The output of full wave rectifier 290 is connected to control windings 348, 350, 352 and 354, said windings being connected in a series circuit relation and disposed inductively on magnetic core members 308, 310, 312 and 314, respectively. During operation, the current which flows in the control windings 348, 350, 352 and 354 of the magnetic amplifier 240 is the difference between the error signal or current from error detecting circuit 270 and the limit signal or current from the upper excitation limit circuit 260. The control windings 348, 350, 352 and 354 of the magnetic amplifier 240 are so disposed on their respective magnetic core members 308, 310, 312 and 314 that when current flows therethrough, the magnetomotive force or ampere-turns produced thereby in the magnetic core members 308 and 310 is opposing with respect to the magnetomotive force or ampere-turns produced by the current flow through the respective load windings 316 and 318, and the magnetomotive force or ampere-turns produced thereby in the magnetic core members 312 and 314 is additive with respect to the magnetomotive force or ampere-turns produced by the current flow through the respective load windings 320 and 322.

Similar to the output of the magnetic amplifier 10 illustrated in FIG. 1 and described previously, the net or total output of the magnetic amplifier 240, as measured by the relative outputs of the sections 242 and 244 in the buck and boost field windings 226 and 228, respectively, varies with the error signal current from error detecting circuit 270 between predetermined upper and lower limits. If the error signal current $I_c$ exceeds the current $I_u$ from upper excitation limit circuit 260, the upper limit control current $I_u$ will determine the output of the magnetic amplifier 240. If the error signal current $I_c$ falls below the current $I_L$ from the lower excitation limit circuit 250, the lower excitation limit current will determine the output of the magnetic amplifier 240.

The regulator system 230 will function according to the principles outlined herein regardless of the signs on the upper and lower limits. For example, the upper and lower limit may both be positive, the upper limit may be plus and the lower limit negative, or both the upper and lower limits may be negative.

During the normal operation of the regulator system 230, when said regulator system is responding to the error signal from the error detecting circuit 270 and the output voltage of the generator 200 increases to a value above the predetermined value but below the upper excitation limit, the error signal current $I_c$ will decrease, causing a decrease in the output of section 242 and an increase in the output of section 244. Therefore, there is less current in the boost winding 228 and more current in the buck winding 226, causing the output of the exciter 20 and therefore, the voltage output of the generator 200 to drop back to the desired value. On the other hand, if the output voltage of the generator 200 decreases below its predetermined value, but above the lower excitation limit, the error signal current $I_c$ will increase causing an increase from the output of section 242 and a decrease in the output of section 244. Therefore, there is a greater current in the boost winding 228 and less current in the buck winding 226 causing the output of the exciter and therefore, the voltage output of the generator 200 to increase to the desired value.

It will, therefore, be apparent that there has been disclosed a new and improved electrical control apparatus for obtaining an output which varies with or is responsive to a control signal, within upper and lower limits established by two additional control signals. Also, the signal currents and not the signal voltages are compared, which is highly advantageous in many applications.

Since numerous changes may be made in the above described apparatus and different embodiments of the invention may be made without departing from the spirit thereof, it is intended that all matter contained in the foregoing description or shown in the accompanying drawings shall be interpreted as illustrative, and not in a limiting sense.

I claim as my invention:

1. In combination, a magnetic amplifier having a plurality of control windings and first, second, and third input signals, first and second control windings being responsive to the sum of said first and second input signals, means connected in circuit relation with a third control winding for applying the magnitude of the difference between said first and third input signals thereto, and means connected in circuit relation with a fourth control winding for applying the magnitude of the difference between said second and third input signals thereto, the output of said magnetic amplifier being responsive to the magnitude of said third input signal when said third input signal is between lower and upper limits imposed by said first and second input signals, the output of said magnetic amplifier being responsive to said second input signal when said third input signal exceeds said upper limit, and the output of said magnetic amplifier being responsive to said first input signal when said third input signal is less than said lower limit.

2. In combination, a magnetic amplifier having control windings, means producing first, second and third input signals, said control windings responsive to the sum of first and second input signals, first rectifier means connected in circuit relation with said control windings for applying the magnitude of the difference between said first and third input signals thereto, and first rectifier means connected in circuit relation with said control windings for applying the magnitude of the difference between said second and third input signals thereto, the output of said magnetic amplifier being responsive to the magnitude of said third input signal within lower and upper limits determined by the magnitudes of said first and second input signals.

3. In combination, a magnetic amplifier having control windings responsive to the sum of first and second input signals and two additional control windings, the turns of said additional control windings being substantially equal to those of each of the first mentioned control windings, a third input signal, first rectifier means connected in circuit relation with said first additional control winding for applying the magnitude of the difference between said first and third input signals thereto, and second rectifier means connected in circuit relation with said second additional control winding for applying the magnitude of the difference between said second and third input signals thereto, the magnetomotive force produced in said magnetic amplifier by said second additional control winding opposing the magnetomotive force produced in said magnetic amplifier by said other control windings, the output of said magnetic amplifier being responsive to the magnitude of said third input signal within lower and upper limits, said lower and upper limits being determined by the magnitudes of said first and second input signals.

4. Electric control apparatus, comprising, a magnetic amplifier having first, second, third and fourth control windings and an output winding, first second and third input control signals, said first and second control windings being responsive to said first and second input control signals respectively, first means connected in circuit relation with said third control winding for rendering said third control winding responsive to the magnitude of the difference between said first and third control signals, and second means connected in circuit relation with said fourth control winding for rendering said fourth control winding responsive to the magnitude of the difference between said second and third control signals, the output of said magnetic amplifier varying with the magnitude of said third control signal within upper and lower limits, said upper and lower limits being determined by the magnitudes of said first and second control signals.

5. Electric control apparatus comprising, a magnetic amplifier having first, second, third and fourth control windings and an output winding, first, second and third input control signals, said first and second control windings being responsive to said first and second input control signals respectively, first rectifier means connected in circuit relation with said third control winding for rendering said third control winding responsive to the magnitude of the difference between said first and third control signals, and second rectifier means connected in circuit relation with said fourth control winding for rendering said fourth control winding responsive to the magnitude of the difference between said second and third control signals, the magnetomotive force produced in said magnetic amplifier by said fourth control winding opposing the magnetomotive force produced in said magnetic amplifier by said first, second and third control windings, the output of said magnetic amplifier varying with the magnitude of said third control signal within upper and lower limits, said upper and lower limits being determined by the magnitudes of said first and second input control signals.

6. Electric control apparatus comprising, a magnetic amplifier having first, second, third and fourth control windings and an output winding, first, second and third input control signals, said first and second control windings being responsive to said first and second input control signals respectively, the turns of each of said control windings being substantially equal, first rectifier means connected in circuit relation with said third control winding for rendering said third control winding responsive to the magnitude of the difference between said first and third control signals, and second rectifier means connected in circuit relation with said fourth control winding responsive to the magnitude of the difference between said second and third control signals, the output of said output winding of said magnetic amplifier varying with the magnitude of said third control signal within upper and lower limits, said upper and lower limits being determined by the magnitudes of said first and second control signals.

7. Electric control apparatus comprising, a magnetic amplifier comprising first, second, third and fourth control windings and an output winding, first, second and third input control currents, said first and second control windings being responsive to said first and second input control currents respectively, first means connected in circuit relation with said third control winding for rendering said third control winding responsive to the magnitude of the difference between said first and third control currents, and second means connected in circuit relation with said fourth control winding for rendering said fourth control winding responsive to the magnitude of the difference between said second and third control currents, the output of said output winding of said magnetic amplifier varying with the magnitude of said third control signal within upper and lower limits, said upper and lower limits being determined by the magnitudes of said first and second input control currents.

8. Electrical control apparatus comprising, amplifying means magnetically responsive to the sum of input signals applied thereto, first means for applying a first input signal to said amplifying means, second means for applying a second input signal to said amplifying means, third means for producing an error signal, fourth means for electrically applying the differnece between said first input signal and said error signal as a third input signal to said amplifying means, and fifth means for electrically applying the difference between said second input signal and said error signal as a fourth input signal to said amplifying means, the output of said amplifying means varying with said error signal within upper and lower limits, said upper and lower limits being determined by the magnitudes of said first and second input signals.

9. Electrical control apparatus comprising, amplifying means responsive to the sum of the input currents applied thereto, first means for applying a first input current to said amplifying means, second means for applying a second input current to said amplifying means, third means for producing an error current, fourth means for applying the difference between first input current and said error current as a third input current to said amplifying means, and fifth means for applying the difference between second input current and said error current as a fourth input current to said amplifying means, the output of said amplifying means varying with said error current within upper and lower limits, said upper and lower limits being determined by the magnitudes of said first and second input currents.

10. Electrical control apparatus comprising, amplifying means responsive to the sum of unidirectional input signals applied thereto, first means for applying a first unidirectional input signal to said amplifying means, second means for applying a second unidirectional input signal to said amplifying means, third means for producing a unidirectional error signal, fourth means for applying the difference between said first unidirectional input signal and said unidirectional error signal as a third unidirectional input signal to said amplifying means, and fifth means for applying the difference between said second unidirectional input signal and said unidirectional error signal as a fourth unidirectional input signal to said amplifying means, the output of said amplifying means varying with said unidirectional error signal within upper and lower limits, said upper and lower limits being determined by the magnitudes of said first and second unidirectional input signals, the output of said magnetic amplifier responsive to said upper limit when said error signal exceeds said upper limit, and the output of said magnetic amplifier responsive to said lower limit when said error signal is less than said lower limit.

11. A regulator system for maintaining at substantially a predetermined value the output voltage of a dynamoelectric machine having output terminals and an excitation field winding comprising, first means for obtaining an error signal which varies with the deviation of said output voltage from said predetermined value, second means connected in circuit relation between said first means and said field winding for controlling the excitation current supplied thereto in accordance with the net sum of the signals applied to said second means, third means connected in circuit relation between said output terminals and said second means for applying a first limiting signal to said second means, fourth means connected in circuit relation with said second means for applying a second limiting signal to said second means, fifth means connected in circuit relation with said second means for applying to said second means, the difference between said error signal and said first limiting signal, and sixth means connected in circuit relation with said second means for applying to said second means, the difference between said error signal and said second limiting signal, the output of said second means varying with said error signal within upper and lower limits established by said first and second limiting signals.

12. A regulator system for maintaining at substantially a predetermined value the output voltage of a dynamoelectric machine having output terminals and an excitation field winding comprising, first means for obtaining an error signal which varies with the deviation of said output voltage from said predetermined value, second means comprising magnetic amplifier means connected in circuit relation between said first means and said field winding for controlling the excitation current supplied thereto in accordance with the net sum of control signals applied to said magnetic amplifier means, third means connected in circuit relation between said output terminals and said magnetic amplifier means for applying a first limiting signal to said magnetic amplifier means, fourth means connected to circuit relation between said output terminals and said magnetic amplifier means for applying a second limiting signal to said magnetic amplifier means, fifth means connected in circuit relation with said magnetic amplifier means for applying thereto the difference between said error signal and said first limiting signal, and sixth means connected in circuit relation with said magnetic amplifier means for applying thereto the difference between said error signals and said second limiting signal, the output of said magnetic amplifier means varying with the error signal between upper and lower limits, said upper and lower limits being determined by the magnitudes of said first and second limiting signals, the output of said magnetic amplifier responsive to said upper limit when said error signal exceeds said upper limit, and the output of said magnetic amplifier responsive to said lower limit when said error signal is less than said lower limit.

13. A regulator system for maintaining at substantially a predetermined value the output voltage of a dynamoelectric machine having output terminals and an excitation field winding comprising, first means for obtaining an error signal which varies with the deviation of said output voltage from said predetermined value, second means connected in circuit relation between said first means and said field winding for controlling the excitation current supplied thereto in accordance with the net sum of the signals applied to said second means, third means connected in circuit relation between said output terminals and said second means for applying a first limiting signal to said second means, fourth means connected in circuit relation with said second means for applying a second limiting signal thereto, first rectifier means connected in circuit relation with said second means for applying thereto the difference between said error signal and said first limiting signal, and second rectifier means connected in circuit relation with said second means for applying thereto the difference between said error signal and said second limiting signal, the output of said second means varying with said error signal within upper and lower limits established by said first and second limiting signals.

14. A regulator system for maintaining at substantially a predetermined value the output voltage of a dynamoelectric machine having output terminals and an excitation field winding comprising, first means for obtaining an error signal which varies with the deviation of said output voltage from said predetermined value, second means comprising magnetic amplifier means connected in circuit relation between said first means and said field winding for controlling the excitation current supplied thereto, third means connected in circuit relation between said output terminals and said magnetic amplifier means for applying a first limiting signal to said magnetic amplifier means, fourth means connected in circuit relation between said output terminals and said magnetic amplifier means for applying a second limiting signal to said magnetic amplifier means, first rectifier means connected in circuit relation with said magnetic amplifier means for applying thereto the difference between said error signal and said limiting signal, and second rectifier means connected in circuit relation with said magnetic amplifier means for applying thereto the difference between said error signal and said second limiting signal, the output of said magnetic amplifier means varying with the error signal between upper and lower limits, said upper and lower limits being determined by the magnitudes of said first and second limiting signals.

15. A regulator system for maintaining at substantially a predetermined value the output voltage of a dynamoelectric machine having output terminals and an excitation field winding comprising, first means for obtaining an error control current which varies with the deviation of said output voltage from said predetermined value, second means connected in circuit relation between said first means and said field winding for controlling the excitation current supplied thereto in accordance with the net sum of the control currents applied to said second means, third means connected in circuit relation between said output terminals and said second means for applying a first limiting control current to said second means, fourth means connected in circuit relation with said second means for applying a second limiting control current thereto, fifth means connected in circuit relation with said second means for applying thereto the difference between said error control current and said first limiting control current, and sixth means connected in circuit relation with said second means for applying thereto the difference between said error signal and said second limiting control current, the output of said second means varying with said error control current within upper and lower limits established by said first and second limiting control currents.

16. A regulator system for maintaining at substantially a predetermined value the output voltage of a dynamoelectric machine having output terminals and an excitation field winding comprising, first means for obtaining an error control current which varies with the deviation of said output voltage from said predetermined value, second means comprising magnetic amplifier means connected in circuit relation between said first means and said field winding for controlling the excitation current supplied thereto in accordance with the net sum of control currents applied to said magnetic amplifier means, third means connected in circuit relation between said output terminals and said magnetic amplifier means for applying a first limiting control current to said magnetic amplifier means, fourth means connected in circuit relation between said output terminals and said magnetic amplifier means for applying a second limiting control current to said magnetic amplifier means, fifth means connected in circuit relation with said magnetic amplifier means for applying thereto the difference between said error control current and said first limiting control current, and sixth means connected in circuit relation with said magnetic amplifier means for applying thereto the difference between said error control current and said second limiting control current, the output of said magnetic amplifier means varying with the error control current between upper and lower limits, said upper and lower limits being determined by the magnitudes of said first and second limiting control currents.

17. A regulator system for maintaining at substantially a predetermined value the output voltage of a dynamoelectric machine having output terminals and an excitation field winding comprising, first means for obtaining an error signal which varies with the deviation of said output voltage from said predetermined value, second means comprising amplifying means connected in circuit relation between said first means and said field winding for controlling the excitation current supplied thereto in accordance with the net sum of the signals applied to said second means, third means for applying a first limiting signal to said second means, fourth means for applying a second limiting circuit signal to said second means, fifth means connected in circuit relation with said second means for applying thereto the difference between said error signal and said first limiting signal, and sixth means connected in circuit relation with said second means for applying thereto the difference between said error signal and said second limiting signal, the output of said second means varying with said error signal between upper and lower limits, said upper and lower limits being determined by the magnitudes of said first and second limiting signals.

18. A regulator system for maintaining at substantially a predetermined value the output voltage of a dynamoelectric machine having output terminals and an excitation field winding comprising, first means for obtaining an error signal which varies with the deviation of said output voltage from said predetermined value, second means comprising amplifying means having control windings connected in circuit relation between said first means and said field winding for controlling the excitation current supplied thereto in accordance with the signals applied to said control windings, third means connected in circuit relation with said second means for applying a first limiting signal to certain of said control windings, fourth means connected in circuit relation with said second means for applying a second limiting signal to certain of said control windings, fifth means connected in circuit relation with another of said control windings for applying thereto the difference between said error signal and said first limiting signal, and sixth means connected in circuit relation with another of said control windings for applying thereto the difference between said error signal and said second limiting signal, the output of said second means varying with said error signal between upper and lower limits, said upper and lower limits being determined by the magnitudes of said first and second limiting signals.

19. A regulator system for maintaining at substantially a predetermined value the output voltage of a dynamoelectric machine having output terminals and an excitation field winding comprising, first means for obtaining an error signal which varies with the deviation of said output voltage from said predetermined value, second means comprising magnetic amplifying means having a plurality of control windings connected in circuit relation between said first means and said field winding for controlling the excitation current supplied thereto in accordance with the signals applied to said control windings, third means connected in circuit relation with said second means for applying a first limiting signal thereto, fourth means connected in circuit relation with said second means for applying a second limiting signal thereto, first rectifier means connected in circuit relation with another of said control windings for applying thereto the difference between said error signal and said first limiting signal, and second rectifier means connected in circuit relation with another of said control windings for applying thereto the difference between said error signal and said second limiting signal, the output of said second means varying with said error signal between upper and lower limits, said upper and lower limits being determined by the magnitudes of said first and second limiting signals.

20. A regulator system for maintaining at substantially a predetermined value the output voltage of a dynamoelectric machine having output terminals and an excitation field winding comprising, first means for obtaining an error signal which varies with the deviation of said output voltage from said predetermined value, second means comprising magnetic amplifier means having first, second, third and fourth control windings connected in circuit relation between said first means and said field winding for controlling the excitation current supplied thereto in accordance with signals applied to said control windings, third means for obtaining a first limiting signal and connected in circuit relation with said first control winding of said magnetic amplifier means, fourth means for obtaining a second limiting signal and connected in circuit relation with said second control winding, fifth means connected in circuit relation with said third control winding for applying thereto the difference between said error and first limiting signals, and sixth means connected in circuit relation with said fourth control winding for applying thereto the difference between said error and second limiting signals, the magnetomotive force produced in said magnetic amplifier by said fourth control winding opposing the magnetomotive force produced in said magnetic amplifier by first, second and third control windings, the output of said magnetic amplifier means varying with said error signal between upper and lower limits, said upper and lower limits being established by said first and second limiting signals.

21. A regulator system for maintaining at substantially a predetermined value the output voltage of a dynamoelectric machine having output terminals and an excitation field winding comprising, first means for obtaining an error control current which varies with the deviation of said output voltage from said predetermined value, second means comprising magnetic amplifier means having first, second, third and fourth control windings connected in circuit relation between said first means and said field winding for controlling the excitation current supplied thereto in accordance with the currents applied to said control windings, third means for obtaining a first limiting control current and connected in circuit relation with said first control winding of said magnetic amplifier means, fourth means for obtaining a second limiting control current and connected in circuit relation with said second control winding, first rectifier means connected in circuit relation with said third control winding for applying thereto the difference between said error and first limiting control currents, and second rectifier means connected in circuit relation with said fourth control winding for applying thereto the difference between said error and said second limiting control currents, the output of said magnetic amplifier means varying with said error control current between upper and lower limits, said upper and lower limits being established by said first and second limiting control currents.

22. A regulator system for maintaining at substantially a predetermined value the output voltage of a dynamoelectric machine having output terminals and an excitation field winding comprising, a first, second and third control signal source, said first control signal source producing an error control current which varies with the deviation of said output voltage from said predetermined value, said second control signal source producing an upper limiting control current of a predetermined magnitude, said third control signal source producing a lower limiting control current of a predetermined magnitude, magnetic amplifier means having first, second, third and fourth control windings connected in circuit relation between said first signal source and said field winding for controlling the excitation current supplied thereto in accordance with the currents applied to said control windings, said upper limit control current connected in circuit relation with said first control winding of said magnetic amplifier means, said lower limit control current connected in circuit relation with said second control winding, first rectifier means connected in circuit relation with said third control winding for applying thereto the difference between said error and upper limit control currents, and second rectifier means connected in circuit relation with said fourth control winding for applying thereto the difference between said error and lower limit control currents, the output of said magnetic amplifier means being responsive to the upper limit control current, when the error control exceeds the upper limit control current, the output of said magnetic amplifier means being responsive to the error control current when the error control current is intermediate to said upper and lower limit control currents, the output of said magnetic amplifier means responsive to said lower limit control current when the lower limit control current exceeds the error control current.

References Cited by the Examiner
UNITED STATES PATENTS
3,001,123  9/61  Reuther et al. __________ 322—25

LLOYD McCOLLUM, *Primary Examiner.*